(12) United States Patent
Glime, III et al.

(10) Patent No.: US 10,774,938 B2
(45) Date of Patent: Sep. 15, 2020

(54) DIAPHRAGM VALVE WITH METAL SEAT

(71) Applicant: Swagelok Company, Solon, OH (US)

(72) Inventors: William H. Glime, III, Chagrin Falls, OH (US); Branden W. Keeper, Mentor, OH (US)

(73) Assignee: Swagelok Company, Solon, OH (US)

(*) Notice: Subject to any disclaimer, the term of this patent is extended or adjusted under 35 U.S.C. 154(b) by 57 days.

(21) Appl. No.: 16/177,541

(22) Filed: Nov. 1, 2018

(65) Prior Publication Data

US 2019/0136996 A1 May 9, 2019

Related U.S. Application Data

(60) Provisional application No. 62/583,731, filed on Nov. 9, 2017.

(51) Int. Cl.
| | |
|---|---|
| *F16K 7/00* | (2006.01) |
| *F16K 25/00* | (2006.01) |
| *F16K 25/04* | (2006.01) |
| *F16K 7/12* | (2006.01) |
| *F16K 7/14* | (2006.01) |

(52) U.S. Cl.
CPC ............. *F16K 25/005* (2013.01); *F16K 7/12* (2013.01); *F16K 7/14* (2013.01); *F16K 25/00* (2013.01); *F16K 25/04* (2013.01)

(58) Field of Classification Search
CPC ............... F16K 7/12; F16K 7/14; F16K 7/126
USPC .......................................................... 251/331
See application file for complete search history.

(56) References Cited

U.S. PATENT DOCUMENTS

| | | | |
|---|---|---|---|
| 5,215,286 A | 6/1993 | Kolenc | |
| 5,485,984 A | 1/1996 | Itoi et al. | |
| 6,092,550 A | 7/2000 | Gotch et al. | |
| 6,871,803 B1* | 3/2005 | Ohmi | F16K 7/14 239/596 |
| 2007/0045587 A1 | 3/2007 | Kolenc et al. | |
| 2014/0001391 A1* | 1/2014 | Watanabe | F16K 7/12 251/331 |
| 2014/0217321 A1 | 8/2014 | Glime | |
| 2014/0326915 A1* | 11/2014 | Kitano | F16K 7/17 251/331 |
| 2016/0290515 A1* | 10/2016 | Nakata | F16K 7/14 |

* cited by examiner

*Primary Examiner* — Kelsey E Cary
(74) *Attorney, Agent, or Firm* — Calfee, Halter & Griswold LLP

(57) ABSTRACT

A diaphragm valve includes a valve body defining a fluid passageway, a diaphragm assembled with the valve body, and an annular metal valve seat disposed on the valve body surrounding the fluid passageway, the valve seat defining an inverted frustoconical seat sealing surface for sealing against the diaphragm when the diaphragm is in a closed position.

20 Claims, 4 Drawing Sheets

DIAPHRAGM VALVE WITH METAL SEAT

CROSS-REFERENCE TO RELATED APPLICATION

This application claims priority to and all benefit of U.S. Provisional Patent Application Ser. No. 62/583,731, filed on Nov. 9, 2017, for DIAPHRAGM VALVE WITH METAL SEAT, the entire disclosure of which is fully incorporated herein by reference.

FIELD OF THE INVENTION

The present invention relates generally to a valve seat for a diaphragm valve, and more particularly to a metal valve seat for a diaphragm valve, and composition and geometry therefor, for withstanding high temperatures and corrosive materials.

BACKGROUND

Diaphragm valves are generally known and include a valve arrangement wherein a diaphragm seals against an annular valve seat thereby prohibiting the flow of fluid through the valve. As such, the valve seat is used to seal off an inlet or outlet passageway by engaging with the diaphragm. Diaphragms may be made of metal or non-metal materials.

Typical valve seats used with metal diaphragms are designed from a plastic based material, such as polychloro-trifluoro-ethene (PCTFE) or polyimide. However, non-metal valve seats have properties that change when subjected to environmental factors outside the parameters of rated use, such as high or low temperature ranges or exposure to highly corrosive or chemically incompatible fluids. In such aggressive applications, metal valve seats have been used, however, the performance requirements of such known all-metal valves do not typically match the performance of plastic based valve seats. For example, a valve with a metal valve seat may demonstrates a higher leak rate, a decrease in the number of operable cycles, or an increase in the required actuation force. Decreasing the rated number of cycles is a disadvantage, and this disadvantage is even larger for systems operating at high temperatures or regulating a corrosive material as replacement costs can be high. This is because the valve is frequently used to control the flow rate of such materials, thus requiring a dramatic increase in the number of cycles required on a regular basis.

SUMMARY OF THE INVENTION

In accordance with an exemplary embodiment of the present application, a diaphragm valve includes a valve body defining a fluid passageway, a diaphragm assembled with the valve body, and an annular metal valve seat disposed on the valve body surrounding the fluid passageway, the valve seat defining a narrow, inverted shallow frustoconical seat sealing surface for sealing against the diaphragm when the diaphragm is in a closed position.

BRIEF DESCRIPTION OF THE FIGURES

In the accompanying drawings, which are incorporated in and constitute a part of this specification, embodiments of the invention are illustrated, which, together with a general description of the invention given above, and the detailed description given below serve to illustrate the principles of this invention.

DETAILED DESCRIPTION

Figure 1:
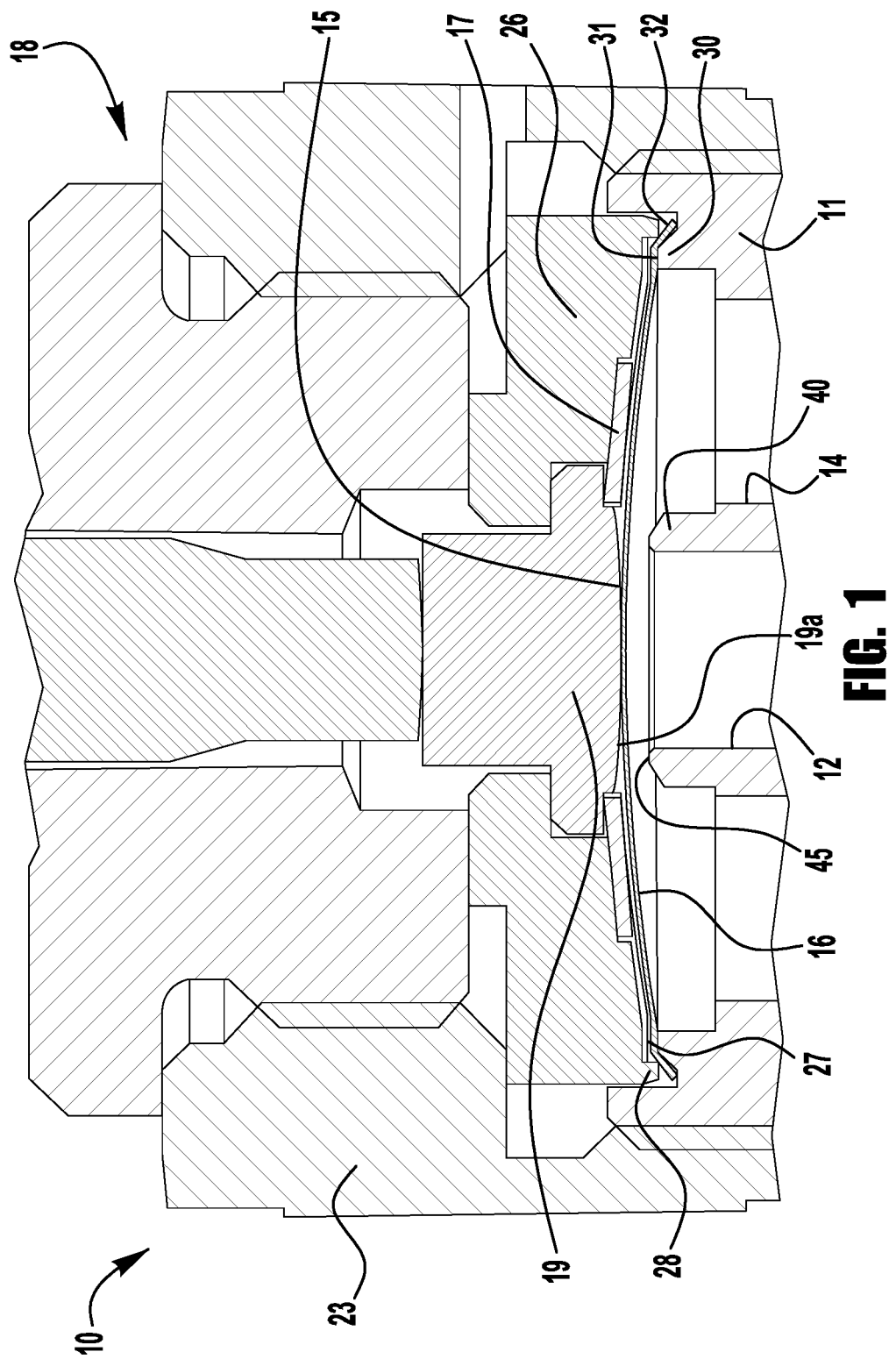
FIG. 1 is a partial cross-sectional view of a diaphragm valve in accordance with an exemplary embodiment of the present application.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

With reference to FIG. 1, an exemplary diaphragm valve 10, in accordance with certain aspects of the present application, includes a valve body 11, a diaphragm 16, and an actuator 18. The valve body 11 includes a first (e.g., inlet) passageway 12, a second (e.g., outlet) passageway 14, and a valve seat 40 surrounding the first passageway. The actuator 18, not shown in detail for the purpose of broad disclosure, includes a button 19 that is operable to move the diaphragm 16 from an open position spaced apart from the valve seat 40, such that fluid is permitted to pass through the valve seat 40 from the inlet passageway 12 to the outlet passageway 14, to a closed position, in which the diaphragm seals against the valve seat 40 to block flow from the inlet passageway to the outlet passageway. The actuator 18 may be provided as any one of a variety of suitable actuators, including, for example, a manual actuator (e.g., a rotatable handle), a pneumatic actuator, and an electric actuator. These and other general aspects of the diaphragm valves contemplated herein that are not discussed further in this application do not pertain to the inventive aspects covered in this application.

Figure 2:
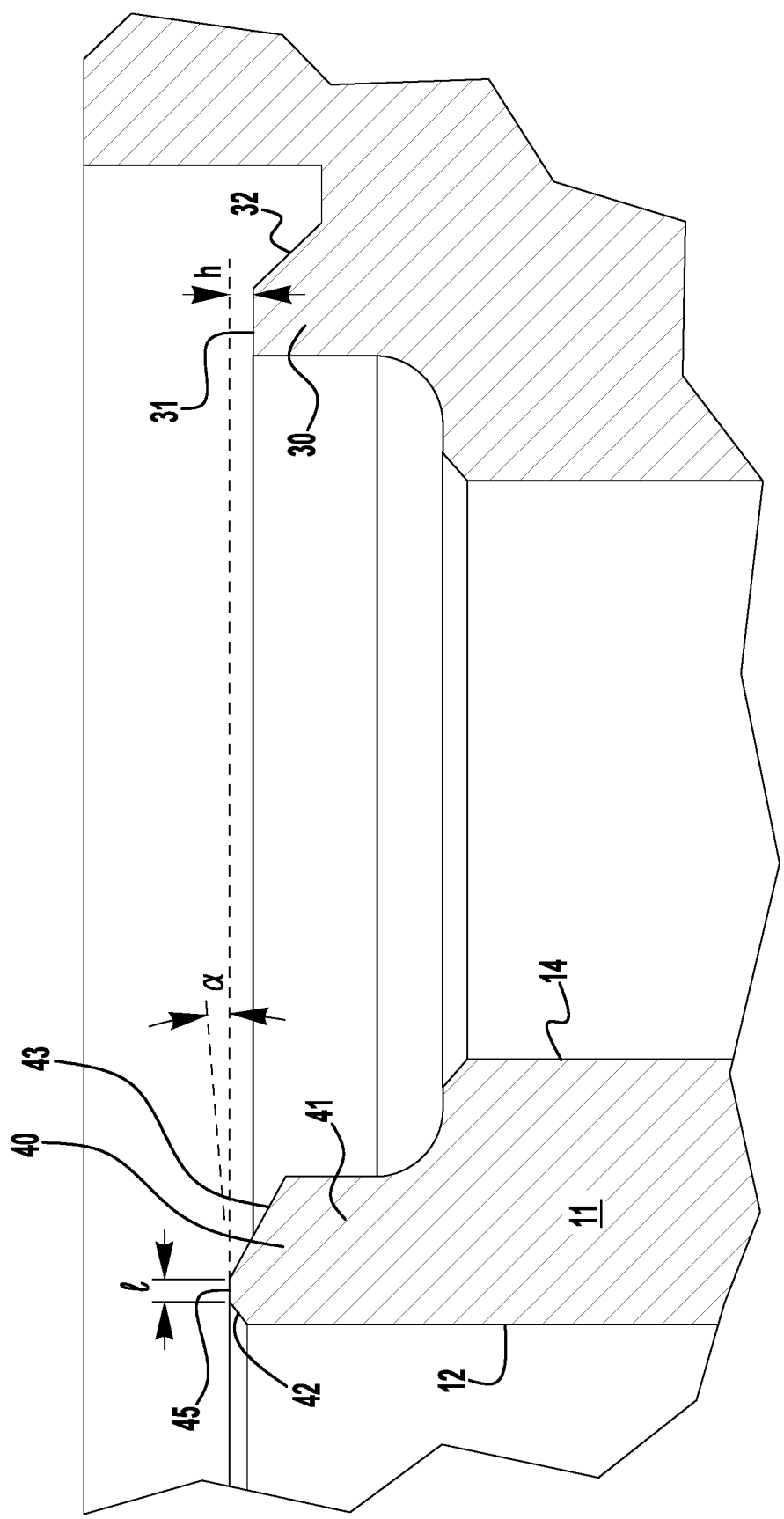
FIG. 2 is an enlarged cross-sectional partial view of the valve seat and diaphragm sealing flange of the diaphragm valve of FIG. 1.

FIG. 2 shows a close-up view of an upper portion of the valve body 11 including the valve seat 40. As shown, the exemplary valve seat 40 is integral with (e.g., welded to or monolithically formed with) the valve body 11 such that the valve seat is formed from the same material as the rest of the valve body (e.g., Inconel 625, 316 stainless steel). The valve seat 40 includes an annular wall portion 41 defining the first passageway 12 and extending axially (along valve seat central axis X) to an upper sealing surface 45 against which the diaphragm 16 seals when the actuator 18 moves the diaphragm to a closed position. As shown, the uppermost portion of the annular wall 41 may include an outward tapered inner surface 42 (extending from the first passageway 12) extending to an inner diameter of the sealing surface 45, and/or an inward tapered outer surface 43 extending to an outer diameter of the sealing surface. While the valve seat sealing surface may be provided in a variety of shapes, sizes, and contours (e.g., annular bead, annular knife edge, or flat annular ring), according to an exemplary aspect of the present application, the sealing surface may be provided as a narrow, inverted shallow frustoconical surface, angled to substantially match a convex surface 19a of the actuator button 19 radially aligned with the sealing surface 45, or incident to the portion of the diaphragm 16 that seals against the sealing surface 45, for example, to provide for contact between an entire radial width of the seat sealing surface 45 and the diaphragm 16 when the diaphragm is in the closed position.

According to an aspect of the present application, a narrow frustoconical band sealing surface may be sized to be narrow enough to minimize actuator closing force required for shutoff, while providing sufficient width to limit seat deformation during shutoff and to account for minor pits or other imperfections in the sealing surface. This controlled sealing surface may provide enhanced sealing performance, for example, as compared to a rounded annular "bead" sealing surface, for which closing forces focused on an initial line contact sealing surface may produce bulk plastic deformation that may affect seat sealing performance, such as, for example, twinning, discontinuous yielding effects, grain anisotropy (i.e., grain orientation that makes the individual grains deform differently than their neighbors under the deforming load), and deformation induced surface roughening (often referred to as an "orange peel" effect). In an exemplary embodiment, as shown in the enlarged view of FIG. 2, the illustrated valve seat sealing surface 45 has a width $\epsilon$ of about 0.007 inches (e.g., 0.005-0.010 inches) disposed at an angle $\alpha$ of about 3° (e.g., 2.5° to 3.5°) with respect to a horizontal plane (i.e., plane perpendicular to the central axis X of the valve seat 25), or about 87° (e.g., 86.5° to 87.5°) with respect to the valve seat central axis. This dimensioning of the sealing surface has been determined to achieve a width of contact between the two surfaces that is large enough to create a seal (intimate contact) width greater than the length of typical irregularities associated with manufactured metal surfaces but small enough to minimize the applied sealing load needed to generate intimate contact between the mating metal surfaces.

The peripheral edge of the diaphragm 16 may be sealed to the valve body 11 in a variety of manners. In the exemplary embodiment, a raised flange 30 extends circumferentially about the upper end of the body 25 and encircles both the outlet passageway 14 and the inlet passageway 12. The outer surface 32 of the flange 30 may be inclined radially outward from the end surface 31 (e.g., at an angle between about 43° and about 47°) or at any suitable angle based on the overall apparatus design and configuration.

The diaphragm 16 is retained against the top planar surface 30a of the flange 30. The diaphragm may be provided with a convex center section and a generally planar, radially extending peripheral edge section, for example, to accommodate sealing engagement with the flange planar surface. A base or bonnet portion 26 of the actuator 18 may include a contoured lower peripheral surface which includes a flat 27 that is surrounded by a cylindrical wall 28. When the bonnet 26 is assembled with the valve body 11 (e.g., secured by bonnet nut 23, see FIG. 1), the flat 27 clamps the top surface of the diaphragm 16 against the flange end surface 31 as shown. The cylindrical wall 28 deflects and bends the outer peripheral portion of the diaphragm downwardly creating sealing engagement against the flange outer wall 32. An exemplary diaphragm crimping arrangement is described in greater detail in U.S. Pat. No. 6,092,550 (the "'550 patent"), the entire disclosure of which is incorporated by reference herein. The diaphragm 16, may, but need not, be supported by an upper support diaphragm 15 and washer 17, as shown in FIG. 1.

According to another aspect of the present application, the end surface 31 of the flange 30 may be recessed from the valve seat seal surface 45, for example, to improve valve cycle life by limiting the stroke or flexure of the diaphragm 16 during valve cycling. In an exemplary embodiment, the flange end surface 31 is recessed or offset from the valve seat sealing surface 45 a distance h of about 0.007 inches (e.g., between 0.007 and 0.008 inches).

In other embodiments, a metal seat (e.g., a metal seat having the sealing surface described above) may be staked into a valve body, for example, to provide a valve seat having different material properties than the valve body (e.g., hardness or other sealing surface conditions). This may provide a more cost-effective option where the desired seat material is a more expensive material that the valve body material, or where the desired seat material is more difficult to machine. In one example, a valve body may be provided in 316 stainless steel, and a seat insert may be provided in Inconel 625. An exemplary staked metal seat insert arrangement is described in U.S. Patent Application Pub. No. 2007/0045587 (the "'587 application"), the entire disclosure of which is incorporated by reference herein. In such an embodiment, additional valve body material required to receive the staked valve seat insert may limit the size of the inlet passageway with respect to the size of the valve seat. For example, in an exemplary embodiment, a valve having a staked metal seat insert with a seat inner diameter of about 0.207 inches may be limited to an inlet passageway diameter of about 0.156 inches, while an integral valve seat having a seat inner diameter of about 0.207 inches may allow for an inlet passageway diameter of about 0.200 inches.

Figure 3:
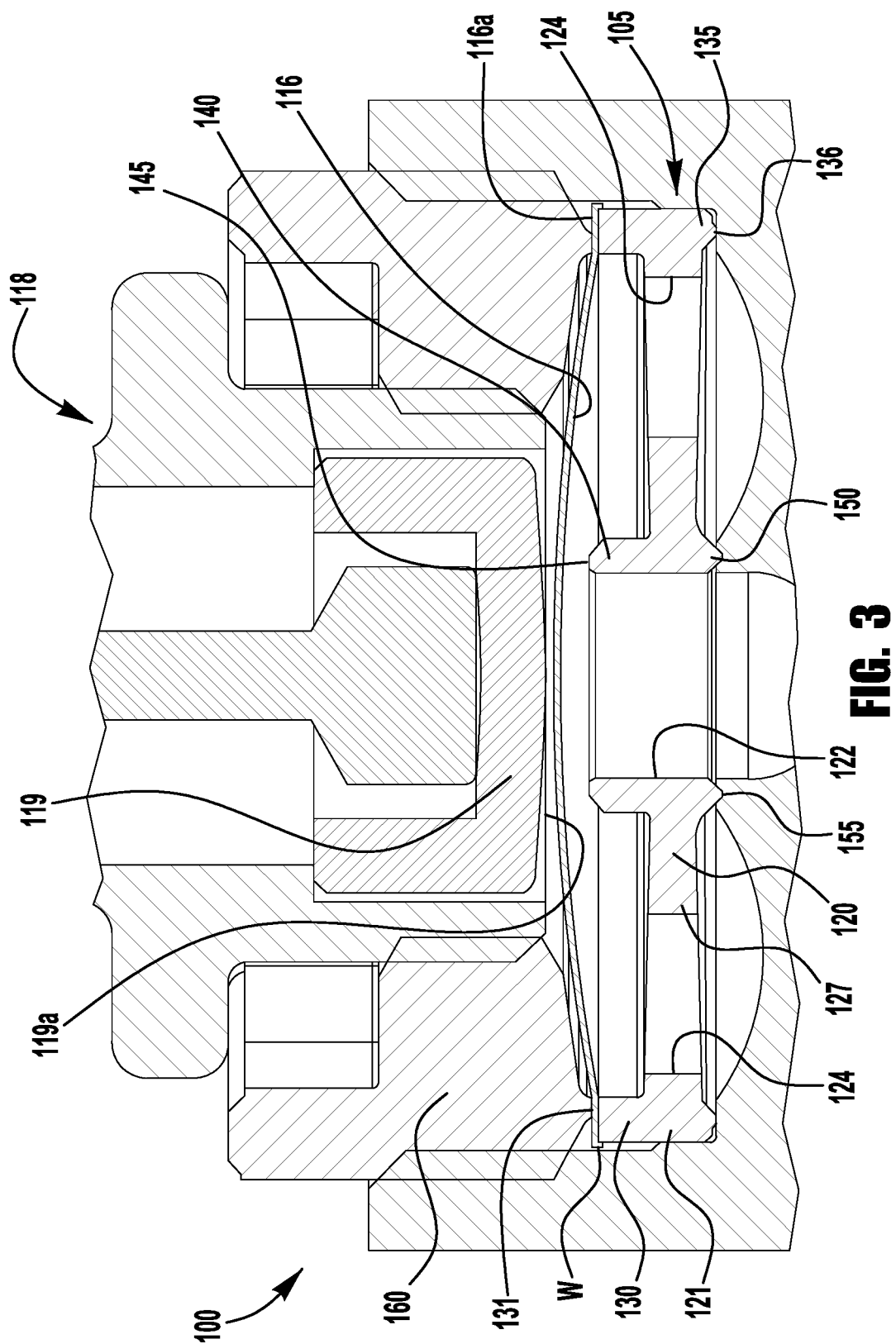
FIG. 3 is a partial cross-sectional view of a diaphragm valve in accordance with another exemplary embodiment of the present application.
Figure 4:
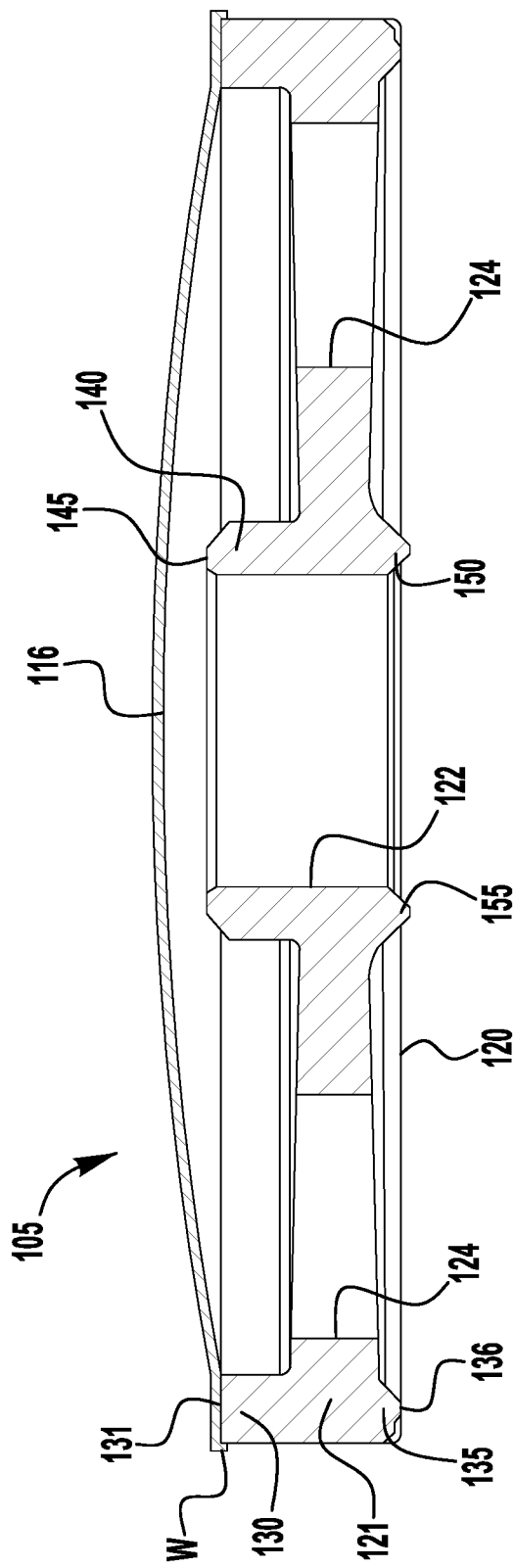
FIG. 4 is an enlarged cross-sectional view of the valve seat cartridge of the diaphragm valve of FIG. 3.

In still other embodiments, a diaphragm valve may be provided with a removable valve seat cartridge that includes a metal valve seat and a diaphragm sealing surface, for example, to provide for replacement or maintenance of the valve seat, or replacement of the diaphragm and/or the diaphragm sealing surface. FIG. 3 illustrates an exemplary diaphragm valve 100 including a removable valve seat cartridge 105 installed in a valve body 110 and retained in the valve body by a threaded nut 160 installed between the valve body 110 and the actuator 118. The valve seat cartridge 105 includes a seat carrier body 120 formed as a disk-like component having an outer rim 121 that encircles first (e.g., inlet) and second (e.g., outlet) ports 122, 124 in the carrier body 120. The outer rim 121 presents an upper flange 130 with a first, upper surface 131 for sealing against the diaphragm 116, and a lower flange 135 with a second, lower surface 136 that faces opposite the first surface 131 and forms a face seal against the valve body 110. While any diaphragm-seat carrier body sealing arrangement may be utilized, in an exemplary embodiment, the diaphragm 116 includes a peripheral edge portion 116a that may be welded along a weld W to the first surface 113 of the outer rim 111, and/or may be clamped against the outer rim by the threaded nut 160. Valve seat cartridges including a diaphragm welded to a seat carrier body are described in U.S. Patent Application Pub. No. 2014/0217321 (the "'321 application"), the entire disclosure of which is incorporated by reference herein.

The seat carrier body 120 further includes a web 127 that extends radially inwardly from the outer rim 121 to a central, seat sealing portion defining the first (e.g., inlet) port 122, with the web portion defining one or more second (e.g., outlet) ports 124. Like the valve seat cartridge of the '321 application, the seat carrier body 120 may be provided with multiple outlet ports 124, for example, to provide for increased flow through the valve regardless of orientation of the valve seat cartridge 105 in the valve body 110. The web 127 may be generally planar or flat and may have a thickness that is less than the axial height of the outer rim 121. When the cartridge 105 is installed in a valve cavity, the first port 122 may align coaxially with the inlet passageway 112 of the valve body. The web 127 may provide for flexure of the seat carrier body upon installation, for example, to facilitate sealing engagement with the valve body, as described in the above incorporated '321 application.

The upper side of the valve seat cartridge 105 includes a valve seat 140 coaxial with and surrounding the first port 122. As shown, the valve seat 140 may be integral with (e.g., welded to or monolithically formed with) the seat carrier body 120 (e.g., in a 316 stainless steel, Inconel 625, or other metal material) and may include a seat sealing surface 145 that may, but need not, be dimensioned similar to the seat sealing surface 45 of the diaphragm valve 10 of FIGS. 1 and 2 for sealing engagement with the diaphragm 116 when the actuator is operated to move the diaphragm to the closed position. As such, the sealing 145 surface may be provided as a narrow, inverted shallow frustoconical surface, angled to substantially match a convex surface 119a of the actuator button 119 radially aligned with the sealing surface 145, or incident to the portion of the diaphragm 116 that seals against the sealing surface 145, for example, to provide for contact between an entire radial width of the seat sealing surface 145 and the diaphragm 116 when the diaphragm is in the closed position. In other embodiments (not shown), the valve seat may be assembled with (e.g., staked into) the seat carrier body.

The lower side of the valve seat cartridge 105 includes a body port seal 150 coaxial with and surrounding the first port 122. The body port seal 150 may also be integral with (e.g., welded to or monolithically formed with) the seat carrier body 120, or may be assembled with (e.g., staked into) the seat carrier body. The body port seal 150 includes a sealing surface 155 that may be provided with any of a variety of suitable shapes, sizes, and contours (e.g., annular bead, annular knife edge, or flat annular ring) for sealing engagement against an annular upper surface of the valve body surrounding the inlet passageway of the valve body. As a static seal, maintained until the valve seat cartridge 105 is removed from the valve 100, the body port seal may be configured to be deformable into sealing engagement with the valve body 110 during installation and/or valve assembly.

In other embodiments (not shown), either or both of the valve seat and the body port seal may be provided as separate metal inserts that may be staked into the seat carrier body, for example, similar to the staked metal seat inserts of the above incorporated '587 application.

Exemplary aspects of the present invention can find use in other valve assemblies that employ plastic seats, whereby the plastic seat may be replaced by a hardened metal seat, including, for example, the removable plastic seat arrangements disclosed in U.S. Pat. No. 5,215,286, incorporated by reference herein in its entirety, and the plastic seat arrangements of the above incorporated '550 patent and '321 application.

Although the invention has been disclosed and described with respect to certain exemplary embodiments, certain variations and modifications may occur to those skilled in the art upon reading this specification. Any such variations and modifications are within the purview of the invention notwithstanding the defining limitations of the accompanying claims and equivalents thereof. Accordingly, departures may be made from such details without departing from the spirit or scope of the applicant's general inventive concept.

What is claimed is:

1. A diaphragm valve comprising:
a valve body defining a fluid passageway;
a diaphragm for sealing the fluid passageway; and
an annular metal valve seat disposed on the valve body surrounding the fluid passageway and defining an inner frustoconical metal seat sealing surface tapered axially inward from an outer diameter to an inner diameter to define a tapered radial width, with the diaphragm sealing against an entirety of the tapered radial width of the valve seat when the diaphragm is in a closed position.

2. The diaphragm valve of claim 1, wherein the valve seat is integral with the valve body.

3. The diaphragm valve of claim 1, wherein the valve seat is monolithically formed with the valve body.

4. The diaphragm valve of claim 1, wherein the valve seat is assembled with the valve body.

5. The diaphragm valve of claim 4, further comprising a valve seat cartridge removable from the valve body, the valve seat being disposed on an upper surface of the valve seat cartridge.

6. The diaphragm valve of claim 5, wherein the valve seat is integral with the valve seat cartridge.

7. The diaphragm valve of claim 5, wherein the valve seat is monolithically formed with the valve seat cartridge.

8. The diaphragm valve of claim 5, wherein the valve seat is assembled with the valve seat cartridge.

9. The diaphragm valve of claim 5, wherein the valve seat cartridge comprises an annular body port seal disposed on a lower surface of the valve seat cartridge opposite the upper surface, the body port seal being secured in sealing engagement with an annular upper surface of the valve body surrounding the fluid passageway.

10. The diaphragm valve of claim 9, wherein the body port seal is integral with the valve seat cartridge.

11. The diaphragm valve of claim 9, wherein the body port seal is monolithically formed with the valve seat cartridge.

12. The diaphragm valve of claim 9, wherein the body port seal is assembled with the valve seat cartridge.

13. The diaphragm valve of claim 1, wherein an upper surface of the valve body comprises an annular flange having an end surface against which an outer periphery of the diaphragm is secured.

14. The diaphragm valve of claim 13, wherein the end surface of the annular flange is recessed from the seat sealing surface.

15. The diaphragm valve of claim 13 wherein the outer periphery of the diaphragm is welded to the annular flange.

16. The diaphragm valve of claim 1, wherein the diaphragm contacts an entire radial width of the seat sealing surface when the diaphragm is in the closed position.

17. The diaphragm valve of claim 1, wherein the valve seat includes an annular wall portion defining the first passageway and extending axially along a central axis of the valve seat to the seat sealing surface, with an uppermost portion of the annular wall including an outward tapered inner surface extending from the fluid passageway to an inner diameter of the seat sealing surface, and an inward tapered outer surface extending to an outer diameter of the seat sealing surface.

18. The diaphragm valve of claim 1, further comprising an actuator including a bonnet portion assembled to the valve body and an actuator button that engages the diaphragm and is operable to move the diaphragm to the closed position.

19. The diaphragm valve of claim 18, wherein the actuator button comprises a convex diaphragm engaging surface, wherein a portion of the convex diaphragm engaging surface that aligns with the seat sealing surface is disposed at an angle that substantially matches an angle of the frustoconical sealing surface.

20. A sealing arrangement for a diaphragm valve, comprising:
    an annular metal valve seat defining a central fluid passageway and an inner frustoconical metal seat sealing surface tapered axially inward from an outer diameter to an inner diameter to define a tapered radial width;
    a diaphragm adjacent to the annular metal valve seat; and
    an actuator including a button operable to move the diaphragm from an open position spaced apart from the valve seat to a closed position in which the diaphragm seals against the seat sealing surface;
    wherein the tapered radial width is angled to substantially match a convex surface of the actuator button radially aligned with the seat sealing surface to provide for contact between an entirety of the tapered radial width of the seat sealing surface and the diaphragm when the diaphragm is in the closed position.

\* \* \* \* \*